…

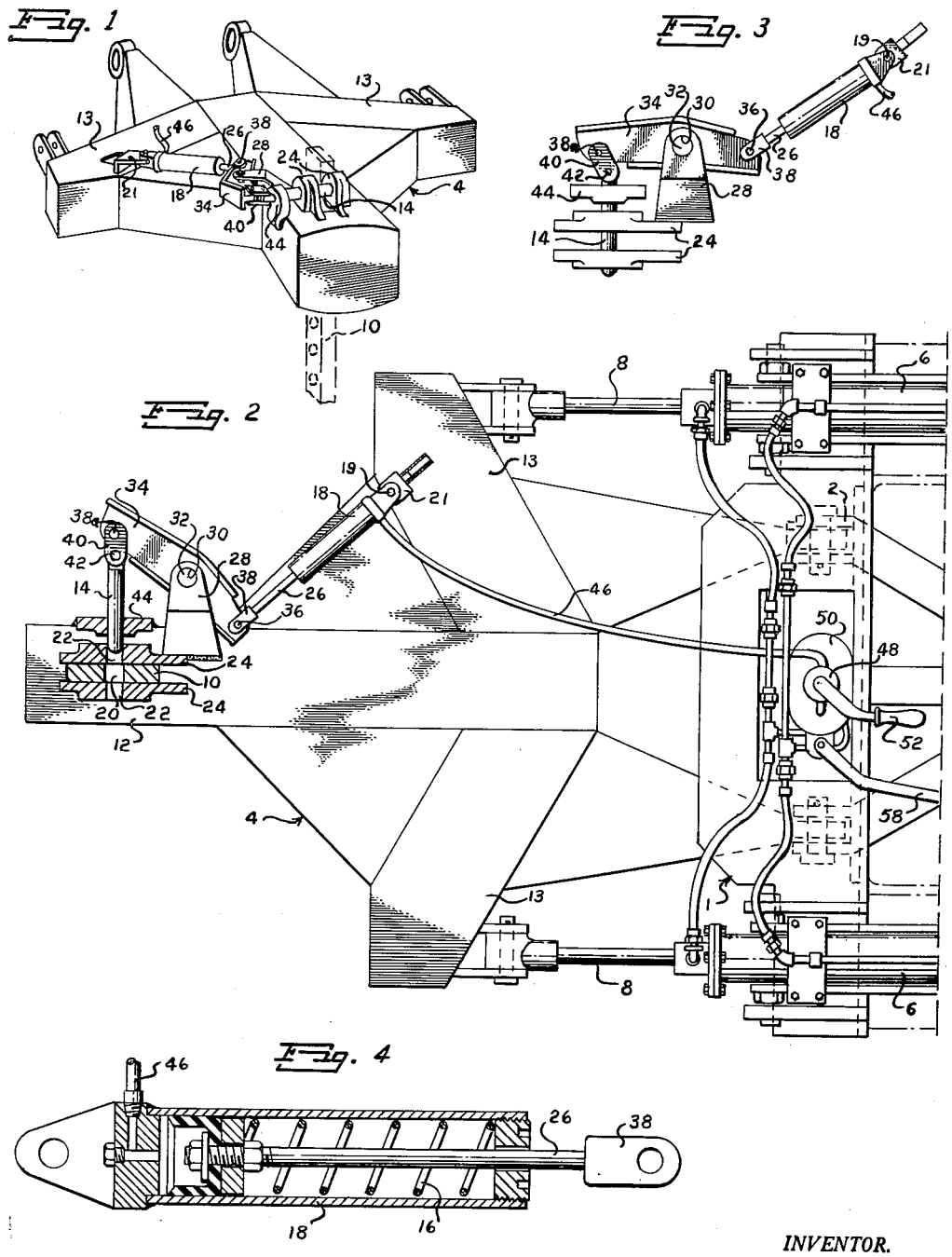

United States Patent Office 3,050,135
Patented Aug. 21, 1962

3,050,135
RIPPER SHANK ADJUSTMENT DEVICES
Leon O. Kelley, P.O. Box 488, Stamford, Tex.
Filed July 14, 1959, Ser. No. 827,026
1 Claim. (Cl. 172—681)

This invention relates to ripper shank adjustment devices, and more particularly to a hydraulically actuated pin retracting device to enable the shank of the ripper to be selectively adjusted, from a remote point, with respect to the ripper frame.

Heretofore, when it was necessary to adjust the ripper tool bar shank with respect to the frame of the ripper, it was necessary to manually retract the pin which passes through the tool bar shank and the lug on the ripper frame, and to move the frame of the ripper to a higher or lower position, then try to align the holes in the tool bar shank with the holes in the lugs on the ripper frame. This usually required two workmen, and was laborious and time consuming work.

The present device enables the operator to retract the pin from engagement with the tool bar shank and tool bar easily and without the aid of a second workman.

An object of this invention is to provide a hydraulically actuated pin retracting device for retracting the pin from and inserting the pin into and through a selected hole in a tool bar shank of a ripper.

Another object of the invention is to provide a hydraulic pin actuating device which may be remotely controlled, to readily change the pin from one position in the tool bar shank to another position therein.

A further object of the invention is to provide a hydraulically actuated pin actuating device that is simple in construction, low in the cost of manufacture, easy to install and repair, and which is easy to operate.

With these objects in mind and others which will become manifest as the description proceeds, reference is to be had to the accompanying drawings, in which like reference characters designate like parts in the several views thereof, in which:

FIG. 1 is a perspective view of the device showing an end, a side, and the top thereof, as installed upon a ripper frame, the ripper tool bar shank being shown in dashed outline, with the pin actuating device thereon, with the pin engaged;

FIG. 2 is a fragmentary plan view of a tractor showing the ripper installed thereon, which ripper is shown to have a hydraulic pin actuating device thereon, with the pin attached to the device, with the pin being shown in retracted position;

FIG. 3 is a plan view of the hydraulic device for actuating a coupling pin of the ripper, showing the pin in engaged position; and FIGURE 4 is a longitudinal, sectional view through the hydraulically actuated cylinder, and showing a spring therein for the resilient return of the hydraulically actuated plunger of the cylinder.

With more detailed reference to the drawing, the numeral 1 designates generally a tractor, which is usually of the crawler type and which is provided with the draw bar connection 2 for connecting a ripper, generally designated by the numeral 4, to the tractor. The ripper is of the character shown in Patent No. 2,783,699, Rippers, issued March 5, 1957, and is raised and lowered by hydraulic cylinders 6, in which hydraulic plungers 8 operate, as is more fully brought out, in the above mentioned patent.

The present ripper is shown to have one tool bar or ripper shank 10, which is usually a bar of iron about three and one-half inches thick, twelve to fourteen inches in width, and from five and one-half to nine and one-half feet in length, and which bar may weigh more than three-fourths of a ton. Therefore, to be able to insert a pin into a hole and to remove the pin from the hole, the holes in the ripper shank and in the tool bar must be properly aligned, as the slightest binding of the pin in the hole would prevent the manual insertion or removal of the pin. However, with the present device, as the frame of the ripper is moved up or down with respect to the tool bar shank 10, the pin 14 may be positioned so the end of the pin will ride on the side of the shank, with the pressure of spring 16, within hydraulic cylinder 18, urging the pin into and through a hole 20 within the tool bar shank 10. Transversely aligned holes 22 are provided on upstanding lugs 24, which lugs 24 are positioned, one on each side, of the tool bar shank 10, so when the tool bar shank 10 is moved relative to the frame 12, the hole 20 will come into register with the holes 22 in the lugs, and the pin 14 will be moved so as to pass through holes 22 and hole 20, so as to firmly secure the tool bar shank 10 in anchored position relative to the ripper frame 12.

The pin 14, when passed through a hole 22 in one of the lugs 24, through hole 20 and into the hole 22 in the opposite lug 24, is held in place by the resilient action of spring 16 acting on the plunger 26 of the hydraulic cylinder 18.

The pin 14 is actuated by a lever and arm actuating means which is connected to the hydraulic plunger 26. A lug 28 is welded, or otherwise secured to the upper face of the ripper frame 12 in such manner as to pivotally mount an arm 34 thereon. The lug 28 has a hole 30 formed therein, through which a pin 32 is positioned to pivotally mount an arm 34. The arm 34 has holes formed therethrough, one near each end thereof and one intermediate the ends. The pin 32 passes through the intermediate hole in arm 34 to pivotally mount the arm 34 about the axis of the pin 32. A pin 36 passes through the hole in one end of the arm 34, which pin 36 pivotally connects the arm 34 with a clevis 38, which clevis is mounted on the end of plunger 26 of the hydraulic cylinder 18. The opposite end of arm 34 is connected to pin 14 by linkage 40. A pin 38a passes through the linkage 40 and through the hole in the opposite end of the arm 34 from the pin 36, so as to pivotally mount the linkage 40 with respect to the arm 34.

The linkage 40 also has a pin 42 which passes therethrough and through the outer end of pin 14, so as to pivotally connect the pin 14 with linkage 40. By having the linkage 40 intermediate the arm 34 and the pin 14, enables the pin to be moved into or out of holes 22 and hole 20 in axial sliding relation, even though the arm swings in an arc.

A guide plate 44 is provided exterior of one of the lugs 24, which plate 44 has an aperture formed therein which is in alignment with apertures 22 of lugs 24, so as to maintain the pin 14 in aligned relation with the holes 22, at all times. When the pin 14 is in the extreme retracted position, the pin 14 will be positioned in the lug 24 adjacent plate 44, so the pin 14 will, at all times, be properly positioned with respect to holes 20 and 22.

One end of the hydraulic cylinder 18 is pivotally mounted, by means of a pin 19, to a lug 21, which lug is welded or otherwise secured to one of the outstanding beams 13 which extend outward from the ripper frame 12. A hose 46 is connected to the fluid end of the cylinder 18 and to a hydraulic control valve 48, which valve is mounted on the hydraulic unit 50. An actuating lever 52 is connected to the hydraulic control valve 48, so as to selectively direct hydraulic fluid under pressure to cylinder 18, when in one position, and to direct the hydraulic fluid therefrom into the hydraulic unit 50, when in another position, in a manner well understood in the art of hydraulics, and it is not considered necessary to elaborate further thereon, in the present application.

Operation

When it is desired to remove the pin 14 from the hole 20 in the tool bar shank 10, the lever 52 is moved to a position to direct hydraulic fluid, under pressure, from hydraulic unit 50 through valve 48, through flexible conduit 46 into hydraulic cylinder 18, which moves plunger 26 outward against tension of spring 16. The plunger 26 will move arm 34 about pivot pin 30, which will withdraw pin 14 from the position as shown in FIGS. 1 and 3, to that shown in FIG. 2. When the pin has been withdrawn in this manner, with the tool bar shank 10 engaged in the ground or in bearing relation thereagainst, the ripper frame 12 may be moved by actuating lever 58, which, in turn, will direct hydraulic fluid into hydraulic cylinders 6 to actuate plungers 8. When the ripper frame 12 has moved to the proper position, with respect to tool bar shank 10, the hydraulic pressure is released from cylinder 18 by valve 48, and spring 16 will cause the hydraulic fluid to be expelled so that the pin 14 will come into contact relation with the side of the tool bar shank 10 adjacent the pin, and by moving the ripper frame 12 with respect thereto, one of the holes 20 will come into register with the pin 14, whereupon, the pin 14 will pass through the hole 20 and through holes 22 in the lugs 24 on opposite sides of the tool bar shank 10 from the original position of the pin 14.

With the tool bar in this position, the hydraulic cylinder 6 may be actuated to move the plungers 8 to raise and lower the ripper 4, thereby saving a great deal of time, as compared to the operation of manually inserting the pin through holes in the ripper tool bar.

While the invention has been described and illustrated in some detail in one embodiment thereof, it is to be understood that changes may be made in the minor details of construction and adaptations made to different installations without departing from the spirit of the invention or the scope of the appended claim.

Having thus clearly shown and described the invention, what is claimed as new and desired to secure by Letters Patent is:

In combination with a ripper frame formed with a substantially vertically disposed ripper shank slot, a substantially upstanding ground engaging plurality apertured shank, a pair of upstanding lugs mounted on said ripper frame on either side of the shank slot, each of which lugs has an aperture formed transversely therethrough, which apertures are in axial alignment, said apertures in said lugs being adapted to register with at least one of said apertures in said shank when said shank is in one position in the shank slot, a slide pin formed with an aperture through the outer end thereof slidably mounted in said apertures in said lugs, a lug mounted on said ripper frame and extending horizontally outward therefrom, said outwardly extending, horizontally disposed lug on said ripper frame having a hole formed therein, an arm, which arm is apertured near each end thereof and intermediate the ends thereof, a pin, which pin is adapted to pass through said intermediate aperture of said arm and through said hole in said outwardly extending, horizontally disposed lug on said ripper frame to pivotally connect said arm to said ripper frame, a hydraulic cylinder, means pivotally connecting said cylinder to said ripper frame, a hydraulically actuated plunger within said cylinder, the outer end of which plunger is apertured to receive a pin therethrough, a pivot pin passing through said aperture in said plunger and through an aperture in an end of said arm to pivotally connect said plunger to said arm, linkage means having apertures adjacent either end thereof, a pivot pin adapted to pass through an aperture in one end of said linkage means and through said aperture in said slide pin, another pivot pin adapted to pass through an aperture in the other end of said linkage means and through said aperture in the other end of said arm to operably connect said arm to said slide pin, conduit means connected with an end of said hydraulic cylinder for selectively directing fluid pressure thereto to effect movement of said cylinder, plunger, arm, linkage means, and slide pin members in the same horizontal plane to slidably retract said pin from engagement with the apertures of one of said lugs of said pair of lugs and said shank, resilient means within said hydraulic cylinder for moving said plunger in an opposite direction upon release of pressure therefrom to urge said slide pin through a selected aperture of said shank and through the aperture of the last mentioned lug to lock the shank in selected position relative to said ripper frame, and guide lug means connected to said ripper frame having an aperture in register with the apertures of said pair of lugs and disposed to have said slide pin slidably mounted therein in the retracted and locked positions.

References Cited in the file of this patent

UNITED STATES PATENTS

| | | |
|---|---|---|
| 1,692,071 | Austin et al. | Nov. 20, 1928 |
| 2,142,454 | Needham | Jan. 3, 1939 |
| 2,750,207 | Greenway | June 12, 1956 |
| 2,783,699 | Kelley | Mar. 5, 1957 |
| 2,860,891 | Ramun | Nov. 18, 1958 |
| 2,882,622 | Howard | Apr. 21, 1959 |
| 2,904,910 | Armington | Sept. 22, 1959 |
| 2,912,774 | McCrary | Nov. 17, 1959 |

FOREIGN PATENTS

| | | |
|---|---|---|
| 1,147,888 | France | June 11, 1957 |